(12) United States Patent
Scavezze et al.

(10) Patent No.: US 9,848,106 B2
(45) Date of Patent: Dec. 19, 2017

(54) INTELLIGENT GAMEPLAY PHOTO CAPTURE

(75) Inventors: Mike Scavezze, Bellevue, WA (US); Arthur Tomlin, Bellevue, WA (US); Relja Markovic, Seattle, WA (US); Stephen Latta, Seattle, WA (US); Kevin Geisner, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 503 days.

(21) Appl. No.: 12/975,166

(22) Filed: Dec. 21, 2010

(65) Prior Publication Data

US 2012/0157200 A1 Jun. 21, 2012

(51) Int. Cl.
*A63F 9/24* (2006.01)
*H04N 5/225* (2006.01)
(Continued)

(52) U.S. Cl.
CPC .............. *H04N 5/225* (2013.01); *A63F 13/00* (2013.01); *A63F 13/20* (2014.09); *A63F 13/213* (2014.09);
(Continued)

(58) Field of Classification Search
CPC ........ A63F 13/00; A63F 13/005; A63F 13/02; A63F 13/08; A63F 13/20; A63F 13/213; A63F 13/219; A63F 13/655; A63F 13/428
(Continued)

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101306249 A | 11/2008 |
| CN | 101482919 A | 7/2009 |

(Continued)

OTHER PUBLICATIONS

Your Shape Featuring Jenny McCarthy (w/Camera) Review, Available on the Wii and PC, Gamespot.com, Jan. 5, 2010.*
(Continued)

*Primary Examiner* — William H McCulloch, Jr.
*Assistant Examiner* — Chase Leichliter
(74) *Attorney, Agent, or Firm* — Alleman Hall Creasman & Tuttle LLP (57) ABSTRACT

Implementations for identifying, capturing, and presenting high-quality photo-representations of acts occurring during play of a game that employs motion tracking input technology are disclosed. As one example, a method is disclosed that includes capturing via an optical interface, a plurality of photographs of a player in a capture volume during play of the electronic game. The method further includes for each captured photograph of the plurality of captured photographs, comparing an event-based scoring parameter to an event depicted by or corresponding to the captured photograph. The method further includes assigning respective scores to the plurality of captured photographs based, at least in part, on the comparison to the even-based scoring parameter. The method further includes associating the captured photographs at an electronic storage media with the respective scores assigned to the captured photographs.

20 Claims, 3 Drawing Sheets

(51) Int. Cl.
   *A63F 13/20*   (2014.01)
   *A63F 13/00*   (2014.01)
   *A63F 13/428*   (2014.01)
   *A63F 13/213*   (2014.01)
   *A63F 13/655*   (2014.01)
   *A63F 13/219*   (2014.01)

(52) U.S. Cl.
   CPC .......... *A63F 13/219* (2014.09); *A63F 13/428* (2014.09); *A63F 13/655* (2014.09); *A63F 2300/63* (2013.01); *A63F 2300/695* (2013.01)

(58) Field of Classification Search
   USPC ............... 463/1, 31, 35, 43; 396/312, 429; 348/61, 64
   See application file for complete search history.

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,263,155 A | 11/1993 | Wang | |
| 5,280,612 A | 1/1994 | Lorie et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,485,607 A | 1/1996 | Lomet et al. | |
| 5,485,608 A | 1/1996 | Lomet et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,617,566 A | 4/1997 | Malcolm | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,742,813 A | 4/1998 | Kavanagh et al. | |
| 5,870,764 A | 2/1999 | Lo et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,966,706 A | 10/1999 | Biliris et al. | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,185,663 B1 | 2/2001 | Burke | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,240,413 B1 | 5/2001 | Learmont | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,374,264 B1 | 4/2002 | Bohannon et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,665,678 B2 | 12/2003 | Ching Chen et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,785,685 B2 | 8/2004 | Soetarman et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 6,961,733 B2 | 11/2005 | Mazzagatti | |
| 6,963,872 B2 | 11/2005 | Whang et al. | |
| 6,970,199 B2 | 11/2005 | Venturino et al. | |
| 7,003,134 B1 | 2/2006 | Covell et al. | |
| 7,015,950 B1* | 3/2006 | Pryor | 348/207.11 |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,071,914 B1* | 7/2006 | Marks | 345/156 |

(56) References Cited

U.S. PATENT DOCUMENTS

| | | |
|---|---|---|
| 7,089,253 B2 | 8/2006 | Hinshaw et al. |
| 7,100,112 B1 | 8/2006 | Winser |
| 7,113,918 B1 | 9/2006 | Ahmad et al. |
| 7,121,946 B2 | 10/2006 | Paul et al. |
| 7,146,366 B2 | 12/2006 | Hinshaw et al. |
| 7,158,975 B2 | 1/2007 | Mazzagatti |
| 7,170,492 B2 | 1/2007 | Bell |
| 7,174,331 B1 | 2/2007 | Luo et al. |
| 7,184,048 B2 | 2/2007 | Hunter |
| 7,202,898 B1 | 4/2007 | Braun et al. |
| 7,213,041 B2 | 5/2007 | Mazzagatti et al. |
| 7,222,078 B2 | 5/2007 | Abelow |
| 7,227,526 B2 | 6/2007 | Hildreth et al. |
| 7,259,747 B2 | 8/2007 | Bell |
| 7,275,074 B2 | 9/2007 | Chandrasekaran |
| 7,290,056 B1 | 10/2007 | McLaughlin, Jr. |
| 7,293,028 B2 | 11/2007 | Cha et al. |
| 7,305,386 B2 | 12/2007 | Hinshaw et al. |
| 7,308,112 B2 | 12/2007 | Fujimura et al. |
| 7,317,836 B2 | 1/2008 | Fujimura et al. |
| 7,340,471 B2 | 3/2008 | Mazzagatti et al. |
| 7,348,963 B2 | 3/2008 | Bell |
| 7,359,121 B2 | 4/2008 | French et al. |
| 7,363,325 B2 | 4/2008 | Yianilos et al. |
| 7,367,887 B2 * | 5/2008 | Watabe et al. ............ 463/36 |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,424,480 B2 | 9/2008 | Mazzagatti |
| 7,430,312 B2 | 9/2008 | Gu |
| 7,434,010 B2 | 10/2008 | Duffy et al. |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,519,628 B1 | 4/2009 | Leverett |
| 7,536,032 B2 | 5/2009 | Bell |
| 7,538,801 B2 | 5/2009 | Hu et al. |
| 7,551,772 B2 | 6/2009 | Lim et al. |
| 7,555,142 B2 | 6/2009 | Hildreth et al. |
| 7,559,841 B2 * | 7/2009 | Hashimoto ............ 463/36 |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,663,689 B2 * | 2/2010 | Marks ............ 348/370 |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,760,248 B2 * | 7/2010 | Marks et al. ............ 348/231.4 |
| 7,809,167 B2 | 10/2010 | Bell |
| 7,822,727 B1 | 10/2010 | Shaughnessy |
| 7,834,846 B1 | 11/2010 | Bell |
| 7,852,262 B2 | 12/2010 | Namineni et al. |
| 7,895,172 B2 | 2/2011 | Cooper et al. |
| RE42,256 E | 3/2011 | Edwards |
| 7,898,522 B2 | 3/2011 | Hildreth et al. |
| 7,899,799 B2 | 3/2011 | Furuya |
| 7,899,800 B2 | 3/2011 | Fachan et al. |
| 7,904,427 B2 | 3/2011 | Lomet |
| 7,911,447 B2 * | 3/2011 | Kouno ............ 345/158 |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,086,579 B1 | 12/2011 | Chandrasekaran et al. |
| 8,121,980 B2 | 2/2012 | Reid et al. |
| 8,135,690 B2 | 3/2012 | Eidt et al. |
| 8,166,481 B2 | 4/2012 | Dadiomov et al. |
| 8,416,996 B2 * | 4/2013 | Ogawa ............ H04N 5/232 382/118 |
| 8,994,790 B2 * | 3/2015 | Ganapathi ............ G06K 9/00342 348/46 |
| 2002/0184242 A1 | 12/2002 | Holtz et al. |
| 2003/0109322 A1 | 6/2003 | Funk et al. |
| 2004/0005924 A1 | 1/2004 | Watabe et al. |
| 2004/0063481 A1 * | 4/2004 | Wang ............ 463/8 |
| 2004/0064439 A1 | 4/2004 | Hinshaw et al. |
| 2004/0078379 A1 | 4/2004 | Hinshaw et al. |
| 2006/0004792 A1 | 1/2006 | Lyle et al. |
| 2006/0010153 A1 | 1/2006 | Bugaj |
| 2006/0022833 A1 * | 2/2006 | Ferguson ............ A61B 5/4023 340/573.1 |
| 2006/0204012 A1 | 9/2006 | Marks et al. |
| 2007/0219999 A1 | 9/2007 | Richey et al. |
| 2008/0026838 A1 | 1/2008 | Dunstan et al. |
| 2008/0075385 A1 | 3/2008 | David et al. |
| 2008/0167102 A1 * | 7/2008 | Diakopoulos et al. ............ 463/11 |
| 2008/0194323 A1 * | 8/2008 | Merkli et al. ............ 463/30 |
| 2008/0228697 A1 | 9/2008 | Adya et al. |
| 2008/0256074 A1 | 10/2008 | Lev et al. |
| 2008/0316327 A1 * | 12/2008 | Steinberg ............ G06K 9/00248 348/222.1 |
| 2009/0070330 A1 | 3/2009 | Hwang et al. |
| 2009/0153652 A1 | 6/2009 | Barenbrug |
| 2009/0251553 A1 * | 10/2009 | Cambell ............ G06F 3/0485 348/211.99 |
| 2009/0252423 A1 | 10/2009 | Zhu et al. |
| 2009/0258703 A1 * | 10/2009 | Brunstetter ............ A63F 13/12 463/36 |
| 2009/0300295 A1 | 12/2009 | Eccles et al. |
| 2009/0318228 A1 * | 12/2009 | Hughes ............ G06F 3/04815 463/36 |
| 2010/0007665 A1 * | 1/2010 | Smith ............ G06T 13/40 345/473 |
| 2010/0023545 A1 | 1/2010 | Gladkov et al. |
| 2010/0153953 A1 | 6/2010 | Adl-Tabatabai et al. |
| 2010/0189356 A1 * | 7/2010 | Sugita ............ G11B 27/28 382/190 |
| 2010/0197390 A1 | 8/2010 | Craig et al. |
| 2011/0029490 A1 | 2/2011 | Agarwal et al. |
| 2011/0077076 A1 * | 3/2011 | Kalson et al. ............ 463/30 |
| 2011/0081088 A1 * | 4/2011 | Xiao ............ G06K 9/00664 382/218 |
| 2011/0116726 A1 * | 5/2011 | Hosaka ............ G06T 5/003 382/255 |
| 2011/0137907 A1 * | 6/2011 | Ikenoue ............ G06F 17/30241 707/740 |
| 2011/0143811 A1 * | 6/2011 | Rodriguez ............ G06K 9/00986 455/556.1 |
| 2011/0292248 A1 * | 12/2011 | de Leon ............ H04N 1/00307 348/231.99 |
| 2011/0306397 A1 * | 12/2011 | Fleming ............ A63F 13/10 463/7 |
| 2011/0320496 A1 | 12/2011 | Reid et al. |
| 2012/0021829 A1 * | 1/2012 | Shoham et al. ............ 463/31 |
| 2014/0125634 A1 * | 5/2014 | Yokokawa ............ G06F 3/011 345/175 |

FOREIGN PATENT DOCUMENTS

| | | |
|---|---|---|
| CN | 201254344 B | 6/2010 |
| CN | 101842810 A | 9/2010 |
| EP | 0583061 A2 | 2/1994 |
| JP | 08044490 A1 | 2/1996 |
| KR | 1020010027533 A | 4/2001 |

(56) References Cited

FOREIGN PATENT DOCUMENTS

| TW | 449490 B | 8/2001 |
|---|---|---|
| TW | 201036424 A | 10/2010 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Lin, et al., "Depth Recovery Using Defocus Blur at Infinity", Retrieved at << http://figment.cse.usf.edu/~sfefilat/data/papers/TuAT9.44.pdf >>, 2008, pp. 4.

Huhle, et al., "Realistic Depth Blur for Images with Range Data", Retrieved at << http://www.gris.uni-tuebingen.de/people/staff/tschairer/papers/dyn3d2009.pdf >>, Sep. 28, 2010, pp. 12.

Nourani-Vatani, et al., "Automatic Camera Exposure Control", Retrieved at << http://citeseerx.ist.psu.edu/viewdoc/download?doi=10.1.1.94.5085&rep=rep1&type=pdf >>, Retrieved Date: Sep. 28, 2010, pp. 6.

"International Search Report", dated Sep. 28, 2012, Application No. PCT/US2011/065709, Filed Date: Dec. 19, 2011, pp. 10.

Yu, Heng, "On Decoupling Concurrency Control from Recovery in Database Repositories", Retrieved at <<http://www.collectionscanada.gc.ca/obj/s4/f2/dsk3/OWTU/Tc-OWTU-649.pdf>>, MastersThesis, Electronic Theses and Dissertations (UW), Faculty of Mathematics Theses and Dissertations, 2005.

Robinson, John T., "Design of Concurrency Controls for Transaction Processing Systems", Retrieved at <<http://oai.dtic.mil/oai/oai?&verb=getRecord&metadataPrefix=html&identifier=ADA121515>>, National Technical Information Service, Apr. 2, 1982.

Bernstein, et al., "Concurrency Control in Distributed Database Systems", Retrieved at <<http://66.102.9.132/search?q=cache:vz4Y0mQtyiEJ:citeseerx.ist.psu.edu/viewdoc/download%3fdoi%3D10.1.196.1086%26rep%3Drep1%26type%Dpdf+detecting+conflict+%2B+concurrency+control+%2B+transation+system+%2B+database%cd=1&hl=en&ct=clnk>>, ACM Computing Surveys (CSUR), vol. 13, Issue 2, Jun. 1981.

"Choosing Row Versioning-based Isolation Levels", Retrieved at http://msdn.microsoft.com/en-us/library/ms188277.aspc>>, Nov. 2009.

Xiangdong, et al., "Distributed Multiversion Optimistic Concurrency Control for Mobile Real-Time Database Systems", Retrieved at <<http://ieeexplore.ieee.org/stamp/stamp.jsp?arnumber=04340523>>, International Conference on Wireless Communications, Networking and Mobile Computing, 2007, Sep. 21-25, 2007.

The State Intellectual Property Office of the People's Republic of China, First Office Action and Search Report Issued in Chinese Patent Application No. 201110431139.8, dated Aug. 5, 2014, 13 Pages.

The State Intellectual Property Office of China, Second Office Action and Search Report Issued in Chinese Patent Application No. 201110431139.8, Mar. 30, 2015, China, 11 Pages.

Taiwan Intellectual Property Office, Office Action and Search Report Issued in Taiwan Patent Application No. 100141077, dated Apr. 11, 2016, 16 Pages. (Submitted With Translation of Search Report).

The State Intellectual Property Office to China, Office Action Issued in Chinese Patent Application No. 201110431139.8, dated Aug. 12, 2016, 8 pages. (Submitted with partial translation of Office Action).

(56) References Cited

OTHER PUBLICATIONS

Taiwan Intellectual Property Office, Office Action and Search Report Issued in Taiwan Patent Application No. 100141077, dated Aug. 23, 2016, 12 pages. (Submitted with translation of Search Repot).
The State Intellectual Property Office of China, Third Office Action and Search Report Issued in Chinese Patent Application No. 201110431139.8, dated Sep. 6, 2015, China, 12 pages.
The State Intellectual Property Office of China, Fourth Office Action Issued in Chinese Patent Application No. 201110431139.8, dated Mar. 4, 2016, China, 8 pages.
Taiwan Intellectual Property Office, Office Action and Search Report Issued in Taiwan Patent Application No. 100141077, dated Dec. 21, 2016, Taiwan, 11 pages. (Submitted with translation of Search Repot).

\* cited by examiner

INTELLIGENT GAMEPLAY PHOTO CAPTURE

BACKGROUND

Electronic gaming platforms may obtain user input from a number of sources. As one example, handheld controller devices may be utilized by game players to provide a control input to the electronic gaming platform. As another example, a player's body positioning may be obtained via one or more cameras or optical elements of the electronic gaming platform. Motion of a player's body position may be tracked by the electronic gaming platform to be utilized as a control input of the player.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations for identifying, capturing, and presenting high-quality photo-representations of acts occurring during play of a game that employs motion tracking input technology are disclosed. As one example, a method is disclosed that includes capturing via an optical interface, a plurality of photographs of a player in a capture volume during play of the electronic game. The method further includes for each captured photograph of the plurality of captured photographs, comparing an event-based scoring parameter to an event depicted by or corresponding to the captured photograph. The method further includes assigning respective scores to the plurality of captured photographs based, at least in part, on the comparison to the even-based scoring parameter. The method further includes associating the captured photographs at an electronic storage media with the respective scores assigned to the captured photographs.

DETAILED DESCRIPTION

As described herein, a plurality of photographs may be captured of a player during active play of a game. The plurality of photographs may be scored to identify and present one or more higher scoring photographs. Scoring of captured photographs may be based on one or more event-based scoring parameters or photographic characteristics of the captured photographs, such as blur, sharpness, exposure, brightness, contrast, hue, temperature, saturation, or other suitable characteristic. For example, photographs captured by a camera may exhibit blur, particularly if a subject in the photograph is moving under poor ambient lighting conditions. A vector field of model may be utilized for scoring, where a higher score is provided to photographs exhibiting lower velocity or acceleration as indicated by blur, for example. A baseline photograph may be captured before game play to provide a control input for adjusting exposure and/or recording parameters of one or more cameras to reduce blur or optimize other suitable photographic characteristic in captured photographs.

Furthermore, event-based scoring parameters may include actions of a player, a group of players, and/or other observing users. For example, photographs capturing actions of a player during game play may be scored according to a pose of the player. In one particular example, a user's pose is scored according to how accurately the pose matches a predefined pose, such as a virtual pose displayed on a graphical display. As yet another example, photographs capturing reactions of other users observing a player during game play may be considered when scoring a photograph. In one particular example, a photograph capturing a player performing a high jump and a crowd of users reacting by cheering is scored based on the high jump of the player as well as the reaction of the crowd. In other words, capturing the actions of the crowd may be of interest, and thus may contribute to a higher score of the photograph. As yet another example, photographs capturing a facial expression of a player may be scored according to predefined criteria. In one particular example, facial recognition algorithms are performed on a photograph capturing a player's face to determine if they are smiling and increases the score of the photograph if the player is smiling.

Figure 1:
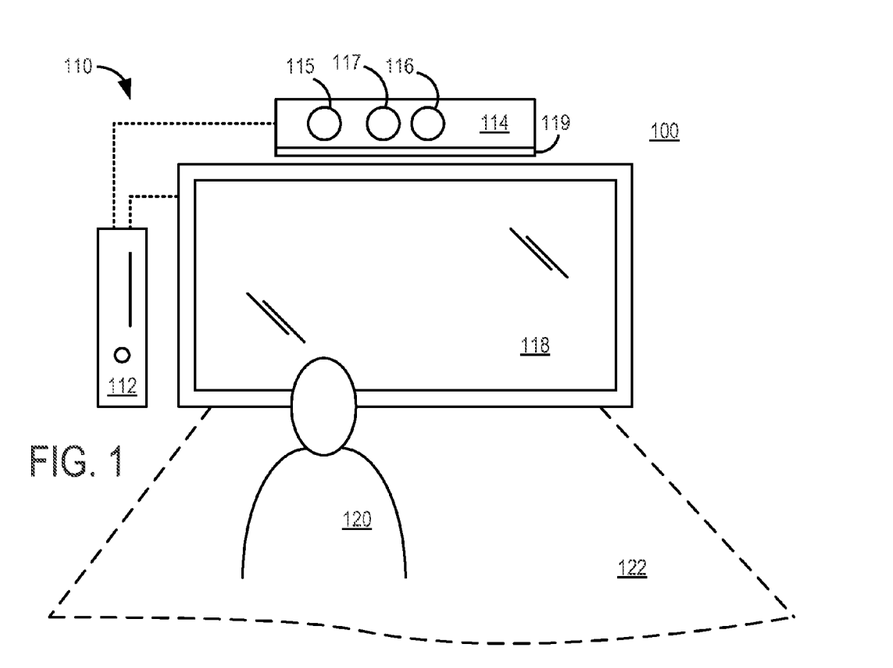
FIG. 1 depicts an example gaming environment according to at least one implementation.

FIG. 1 depicts an example gaming environment 100 according to at least one implementation. Gaming environment 100 includes a gaming system 110 comprising one or more of a game console 112 and a vision subsystem 114. Vision subsystem 114 may include one or more cameras or optical elements. As one example, vision subsystem 114 may include one or more range cameras 115, 116 and an RGB camera 117.

Range cameras 115, 116, for example, may provide depth sensing functionality. In at least some implementations, range cameras or depth sensors 115, 116 may comprise an infrared light projector and a sensor for capturing reflected infrared light and/or ambient light. RGB camera 117 may capture visible light from ambient light sources. In some implementations, vision subsystem 114 may further include an audio sensor 119 to detect audio signals in the gaming environment 100 during game play. In one example, the audio sensor 119 may take the form of a microphone array.

Gaming environment 100 further includes a graphical display 118. Graphical display 118 may be a stand-alone device from gaming system 110, or may alternatively comprise a component of gaming system 110. Game console 112 may communicate with vision subsystem 114 to receive input signals from range cameras or depth sensors 115, 116, RGB camera 117, and audio sensor 119. Game console 112 may communicate with graphical display 118 to present graphical information to players.

A human user, referred to herein as a player 120, may interact with gaming system 110 within capture volume 122. Capture volume 122 may correspond to a physical space which may be captured by one or more cameras or optical elements of vision subsystem 114. Player 120 may move within capture volume 122 to provide user input to game console 112 via vision subsystem 114. Player 120 may additionally utilize another user input device to interact with gaming system 110, such as a controller, a mouse, a keyboard, or a microphone, for example.

Figure 2:
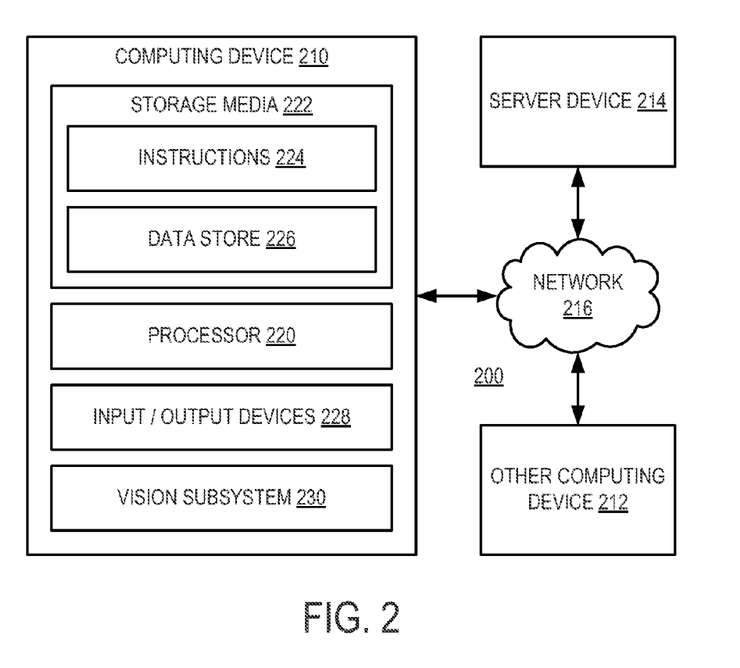
FIG. 2 is a schematic diagram depicting an example computing environment according to at least one implementation.

FIG. 2 is a schematic diagram depicting an example computing environment 200 according to at least one implementation. Computing environment 200 may include a computing device 210, one or more other computing devices such as other computing device 212, and server device 214, which may communicate with each other via network 216. Network 216 may comprise one or more of a wide area network (e.g., the Internet) or a local area network (e.g., an intranet), for example.

Computing device 210 may correspond to an example implementation of previously described gaming system 110, including at least game console 112 and vision subsystem 114. Computing device 210 may include one or more processors such as example processor 220 for executing instructions. Such processors may be single core or multi-core. Computing device 210 may include computer readable storage media 222 having or including instructions 224 stored thereon executable by one or more processors such as example processor 220 to perform one or more operations, processes, or methods described herein. In some implementations, programs executed thereon may be configured for parallel or distributed processing.

Computer readable storage media 222 may include removable media and/or built-in devices. In some implementations, computer readable storage media 222 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others.

In some implementations, computer readable storage media 222 may include removable computer readable storage media, which may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others.

In some implementations, computer readable storage media 222 may include one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

As one example, computing device 210 may establish a criterion that defines one or more moments of interest which correspond to predefined player movements or positions occurring in a capture volume, such as previously described capture volume 122. In at least some implementations, the established criteria may correspond to an anticipated pose that potentially will be assumed by the player during play of a game. The anticipated pose may be game dependent and/or may be dependent on a particular phase of game play that the player is interacting with. In some implementations, a moment of interest may be defined by a phase of game play or an action of a virtual avatar. For example, in a skiing game, a moment of interest may be defined as phase of the game where a virtual avatar jumps off of a ski jump. In some implementations, moments of interest may selectively trigger photograph capture and scoring during a player's game play. In some implementations, photographs may be generated and scored relatively continuously during a player's game play.

A player may assume a number of different body positions during game play. For example, a player may indicate a jumping position by extending arms and legs outward, and/or with the player's feet off of the ground. As another example, a player may indicate a skiing position by posing in a tucked skiing position. As yet another example, a user may indicate plugging of virtual holes existing in a game by positioning the player's body into specific position that correspond to the location of virtual holes. Two or more players may collaborate to indicate still other acts or actions within a game. Computing device 210 may interpret the player's position via input signals received from vision subsystem 230. Vision subsystem 230 may correspond to previously described vision subsystem 114, for example.

Computing device 210 may capture via one or more cameras of vision subsystem 230, a plurality of photographs of a player during play of a game. As one example, previously described RGB camera 117 may be utilized to capture photographs of the player or players during active game play. Photographs captured via vision subsystem 230 may be stored in a data store, such as a local data store 226, for example. Photographs captured via vision subsystem 230 may be additionally or alternatively stored in a remote data store of server device 214, for example.

Computing device 210 may score the captured photographs along a scale of desirability. In some implementations, the scale of desirability may be related to the criteria established to define the one or more moments of interest, where relatively higher scores are assigned to the captured photographs if the player's movements or positions correspond to the criteria established to define the one or more moments of interest. Computing device 210 may utilize a variety of information to score captured photographs, including information obtained from one or more depth or RGB cameras of vision subsystem 230.

In at least some implementations, computing device 210 may score the captured photographs based, at least in part, on one or more event-based scoring parameters or photographic characteristics of the photograph. Photographic characteristics may include, for example, one or more of blur, sharpness, exposure, brightness, contrast, hue, temperature, saturation, etc., among other suitable photographic characteristics. Note event-based scoring parameters may include photographic characteristics. As one example, computing device 210 may assess blur for different photographic regions of the captured photographs, where blur occurring in certain photographic regions of the captured photographs may be weighted more heavily in the score than blur occurring in other photographic regions of the captured photographs.

Furthermore, event-based scoring parameters may include actions of a player, a group of players, and/or other observing users. For example, facial recognition and/or skeletal frame recognition of players and/or users may be utilized to identify one or more regions of the photograph corresponding to the player's face, arms, legs, torso, etc. As one example, a photograph capturing a player may be scored based on how accurately the player assumes a predefined pose, such as a virtual pose displayed on graphical display 118. In some implementations, the player's pose may be scored along a scale of desirability of how closely different parts of a player's body align with a virtual position. In some implementations where multiple players interact with the computing device 210, the computing device 210 may score the pose of each player in a captured photograph. Moreover, score bonuses or multipliers may be achieved when multiple players score highly simultaneously. In some implementations, a facial expression of a player or a user may be scored based on established criteria to contribute to a score of a photograph. For example, the established criteria may dictate the score of a photograph to be increased, if the photograph captures a player that is smiling.

Furthermore, scoring of photographs can be based not only on a player's actions, but also on the actions of other users in the room around them. For example, if a player's photo gains a high score because of a super awesome high jump, the other users observing the player may explode with excitement and jump up and cheer, and catching the act of the crowd of user jumping up could also be of interest and add to a higher score of the photograph.

In some implementations, computing device 210 may score the captured photographs based, at least in part, on audio signals captured by audio sensor 119 at moments when a photograph is captured. For example, sound generated by a player, group of players, and/or other observing users may be identified and utilized to score a photograph. In one particular, example, the score of a photograph may be increased based on captured audio exceeding a sound level threshold, such as when a group of people cheer. As another example, the score of a photograph may be increased based on captured audio matching a model audio signature, such as a player singing a song. As yet another example, photograph capture may be triggered in response to an audio level exceeding an audio threshold and/or captured audio matching a model audio signature.

Computing device 210 may present scored photographs to the player via input/output devices 228. As one example, input/output devices 228 may comprise a graphical display such as previously described graphical display 118 of FIG. 1. In some implementations, computing device 210 may filter the captured photographs based, at least in part, on the respective scores assigned to the captured photographs, and may vary varying presentation of the captured photographs to the player responsive to the filtering. For example, captured photographs may be filtered so that photographs having relatively high scores are presented to a user, and lower scoring photographs are not presented to the user. Furthermore, scores of captured photographs may be presented to a user, and computing device 210 may prompt the player to save or share one or more of the captured photographs after presenting the respective scores to the user.

In at least some implementations, scoring of the captured photographs may be performed remotely, for example, by server device 214. For example, computing device 210 may send one or more of the captured photographs to server device 214 via network 216 for scoring, whereby server device 214 may respond to computing device 210 with respective scores for the one or more of the captured photographs via network 216.

In at least some implementations, server device 214 may host a social networking platform that enables a player or user of computing device 210 to interact with a player or user of other computing device 212 via a social network. In at least some implementations, computing device 210 or server device 214 may identify one or more of the captured photographs that have been shared by a player of computing device with one or more players within the social network. Scoring of the captured photographs may be further based, at least in part, on whether one or more of the captured photographs were shared by the player within the social network. For example, a score of a photograph may be increased in response to a player sharing the photograph with another player. Sharing of photographs may also occur via text messaging, email, or other suitable forms of communication. In some implementations, computing device 210 may score the captured photographs based, at least in part, on a number of people viewing and/or reacting to a player's captured performance.

In at least some implementations, computing device 210 or server device 214 may identify player or user interaction with captured photographs, and may vary a score of the captured photographs in response to such interactions. Examples of user interactions include player ratings, player commentary, sharing of photographs (e.g., as previously discussed), etc. For example, computing device 210 or server device 214 may identify one or more player ratings assigned to captured photographs, such as via the social network. Scoring of captured photographs may be further based, at least in part, on the one or more player ratings. For example, captured photographs that have been assigned higher player ratings may be scored relatively higher than captured photographs that have been assigned lower player ratings. Player ratings may associate a thumbs up/thumbs down information, star rating information, number rating information, commentary, or other suitable information with a captured photograph as metadata, for example.

A score for a captured photograph may be associated with the captured photograph in a data store (e.g., data store 226) as scoring information, for example. In some cases, scoring information may be utilized to select a subset of captured photographs for presentation to a player, for example, as previously discussed. Scoring information may also be utilized as feedback to computing device 210 that may be utilized to determine when or if additional photographs of a player are to be captured. For example, photographs that are associated with a relatively low score may cause computing device 210 to capture additional photographs of the player during subsequent game play in an attempt to capture a photograph having a higher score. As another example, photographs captured during a particular moment or moments in a game may be attributed to or correlated with a higher score relative to other moments in the game. Computing device 210 may capture photographs of the player during the particular moment or moments of subsequent game play that are attributed to or correlated with the higher score in an attempt to capture higher scoring photographs.

Figure 3:
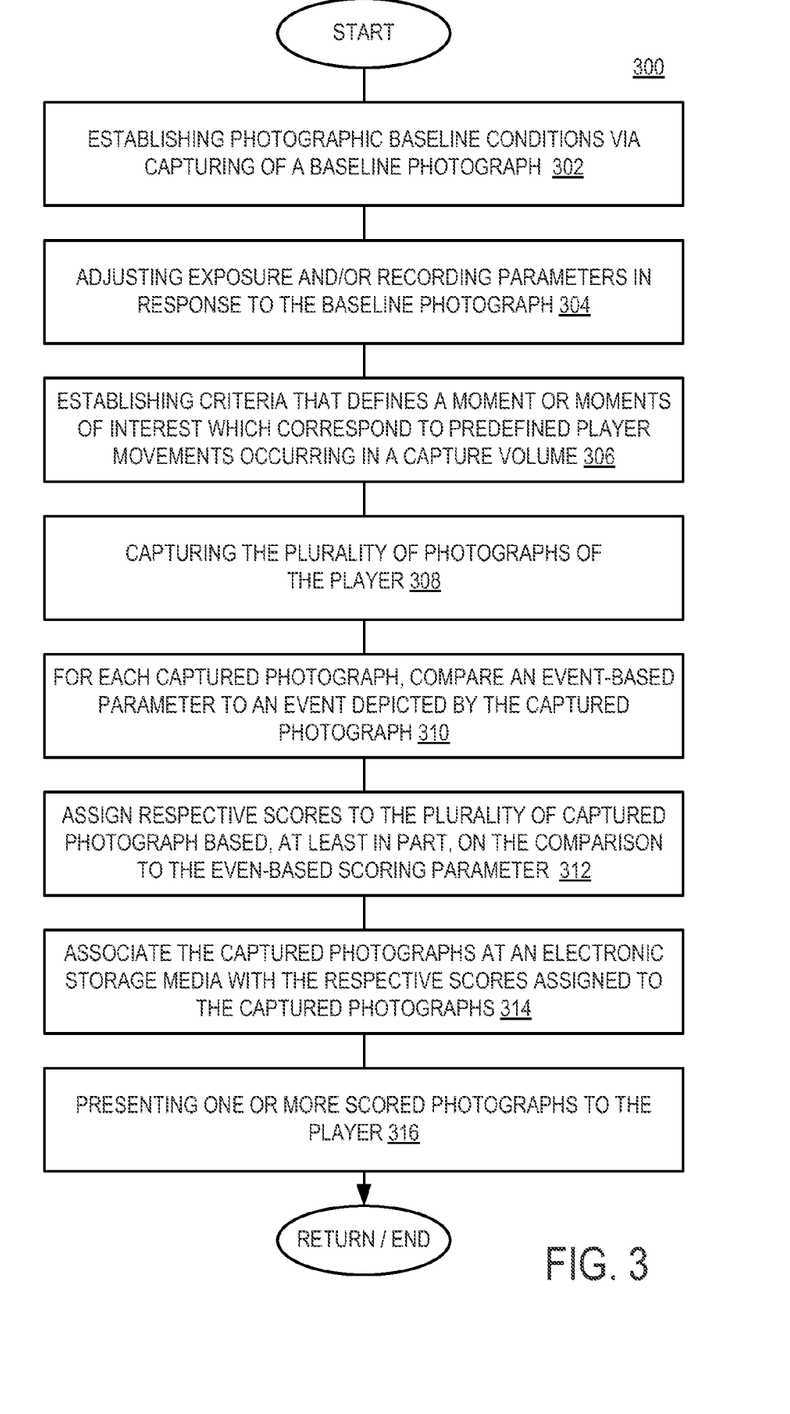
FIG. 3 is a flow diagram depicting an example method according to at least one implementation.

FIG. 3 is a flow diagram depicting an example method 300 according to at least one implementation. Method 300 may comprise a method of identifying, capturing, and presenting high-quality photo-representations of acts occurring during play of a game that employs motion tracking input technology such as previously described with reference to FIGS. 1 and 2. As one example, the photographs may be obtained during play of an electronic game via an optical interface. As one example, method 300 may be performed, at least in part, by previously described computing device 210, server device 214, or a combination thereof.

Operation 302 comprises establishing photographic baseline conditions via capturing of a baseline photograph prior to capturing a plurality of photographs. In at least some implementations, the baseline photograph may comprise a combination of optical information obtained from two or more cameras or optical elements. For example, optical information obtained from an RGB camera may be combined with optical information obtained from one or more range cameras. Operation 304 comprises adjusting exposure and/or recording parameters of the vision subsystem in response to the baseline photograph prior to capturing the plurality of photographs of the player during play of the game.

In at least some implementations, adjustment of the exposure and/or recording parameters of the camera may be based on the entire capture volume of the baseline photograph or may be based on a particular region within the capture volume. For example, the exposure and/or recording parameters may be adjusted in response to a region of the baseline photograph that corresponds to the player's face. In this way, a photograph of a player's face may be obtained during game player even under poor ambient lighting conditions.

In some implementations, the baseline process may be performed more frequently, such as each time a photograph of the user is taken. By performing the baseline process more frequently, the computing system can more quickly adapt to changing conditions, such as the user turning on the lights.

Operation 306 comprises establishing criteria that defines one or more moments of interest which correspond to predefined player movements or positions occurring in a capture volume and/or game play events that direct a player to assume a pose. In at least some implementations, the established criteria correspond to an anticipated pose that potentially will be assumed by the player during play of the game. For example, a player may perform a particular task within a game by moving or positioning the player's body into particular positions within the capture volume. The moments of interest at which these positions may be anticipated may be based on the game being played by the player and/or the particular phase of the game with which the user is interacting. For example, moments of interest may be initiated by triggers placed in different phases of a game where it is anticipated that the player will be in specific poses. As another example, moments of interest may be initiated by detection of a pose defined by the established criteria.

In some implementations, moments of interest may be utilized to selectively trigger initiation of photograph capture. As such, establishing criteria may include identifying a trigger event during play of the electronic game. For example, the trigger event may include identifying a pose assumed by a player. As another example, the trigger event may include a given phase of the electronic game. As yet another example, the trigger event may include an avatar representative of the player assuming a movement or pose that approximates the established criteria. In some implementations where audio is captured via an audio interface during play of the electronic game, the trigger event may include the captured audio exceeding a sound level threshold or exhibiting a model audio signature.

In some implementations, operation 306 may be omitted and photograph capture may be performed relatively continuously throughout game play. For example, in computing systems with a suitably large amount of computing resources, photographs may be captured every frame during game play.

Operation 308 comprises capturing a plurality of photographs of the player. As one example, the plurality of photographs may be captured via an RGB camera of the vision subsystem. In at least some implementations, capturing the plurality of photographs of the player includes capturing the plurality of photographs if the player's movements or positions correspond, at least in part, to the criteria established to define the one or more moments of interest.

Operation 310 comprises for each captured photograph of the plurality of captured photographs, comparing an event-based scoring parameter to an event depicted by or corresponding to the captured photograph. As discussed above, the event-based scoring parameter may include various established criteria that may be compared to the events corresponding to the captured photographs. For example, the established criteria may define one or more predefined player movements or poses within the capture volume. As another example, the established criteria may define one or more predefined avatar movements or poses of an avatar within the electronic game.

In some implementations, the event-based scoring parameter may include a predefined movement or pose of one or more other players or persons within the capture volume. Correspondingly, a captured photograph may be scored based on actions of multiple players, and/or a response from other user observing a player or group of players. In some implementations where audio is captured via an audio interface during game play, at moments corresponding to the captured photographs, the event-based scoring parameter may include a sound level threshold or a model audio signature that may be compared to the captured audio corresponding to the captured photograph.

Operation 312 comprises assigning respective scores to the plurality of captured photographs based, at least in part, on the comparison to the event-based scoring parameter. The scores may be assigned from a scale of desirability which is related to the criteria established for the event-based scoring parameter, where relatively higher scores are assigned to the captured photographs if the player's movements or positions correspond to the established criteria. As one example, assigning respective scores to the captured photographs may include scoring a photograph of the captured photographs with a higher score if the photograph depicts the player attempting to assume a predefined body pose.

The scoring performed at operation 312 may be further based, at least in part, on one or more photographic characteristics identified in the captured photographs. Photographic characteristics may include, for example, one or more of blur, sharpness, exposure, brightness, contrast, hue, temperature, saturation, etc., among other suitable photographic characteristics. As one example, scoring the captured photographs includes scoring a captured photograph relatively higher if the captured photograph exhibits less blur, and relatively lower scores may be assigned to the captured photographs as an increasing function of blur in the captured photographs.

In at least some implementations, scoring the captured photographs may employ a weighting associated with different portions of a captured scene. As one example, photographic characteristics of a photo-representation of the player's face within the captured photographs may be weighted more heavily than photographic characteristics of a photo-representation of the player's lower body within the captured photographs. Operation 312 may comprise, for example, assessing blur or other photographic characteristic for different photographic regions of the captured photographs, where blur occurring in certain photographic regions of the captured photographs is weighted more heavily in the score than blur occurring in other photographic regions of the captured photographs. For example, blur may more heavily reduce a score of a photograph if the blur is within in a photographic region of the photograph corresponding to the player's face.

In at least some implementations, blur or other photographic characteristic may be identified or assessed from a combination of optical information obtained from an RGB camera and one or more ranging cameras of the vision subsystem. For example, a function may be utilized to combine three or more scores, including a skeletal motion score, an RGB score, and a depth score, and a lighting score. High pass filtering or other suitable approach may be applied to optical signals or combinations thereof to identify or assess blur.

In at least some implementations, the scoring performed at operation 312 may further comprise identifying one or more of the captured photographs shared by the player with one or more other players within a social network. The scoring may be further based, at least in part, on whether one or more of the captured photographs were shared by the player within the social network. Photographs that are shared with a great number of players may be increased in score to a greater extent than photograph that are not shared with other players or with a lesser number of players.

In at least some implementations, the scoring performed at operation 312 may further comprise identifying one or more player ratings assigned to a photograph of the captured photographs. The scoring may be further based, at least in part, on the one or more player ratings of the photograph. A score of a photograph may be increased in response to positive or higher player ratings, and may be reduced in response to negative or lower player ratings, for example.

Operation 314 comprises associating the captured photographs at an electronic storage media with the respective scores assigned to the captured photographs. For example, the assigned scores and associated photographs may be stored in data store 226 of FIG. 2. In some implementations, the scored photographs may be saved in the electronic storage media in response to receiving an indication from the user (e.g., via an input device) to save the one or more scored photographs. Since the scores are associated with the photographs in the electronic storage media, the scores may be easily retrievable to perform various operations. For example, the scored photographs may be utilized to adjust a difficulty level of an electronic game or perform another suitable operation.

Operation 316 comprises presenting one or more scored photographs to the player. In at least some implementations, when the scored photographs are presented to the player, operation 316 may further comprise prompting the player with an inquiry about a user action that may be taken with respect to one or more relatively higher scoring photographs. Prompting may be performed, for example, via an output device such as a graphical display. The inquiry may include an inquiry into whether the player wants to save, upload, and/or send the scored photographs to a desired location or to a desired user.

Figure 4:
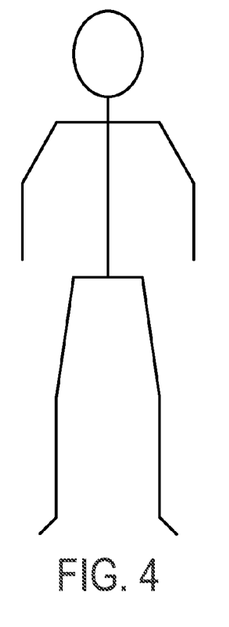
FIGS. 4, 5, and 6 are diagrams depicting different states of an example body position of a player as may be captured in photographs.
Figure 5:
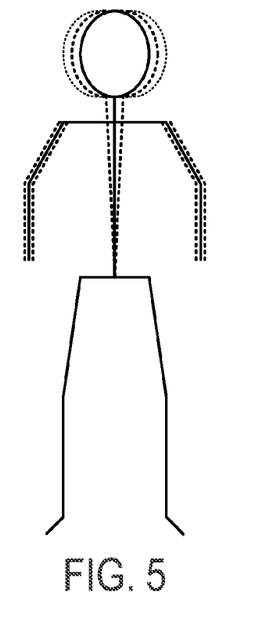
Figure 6:
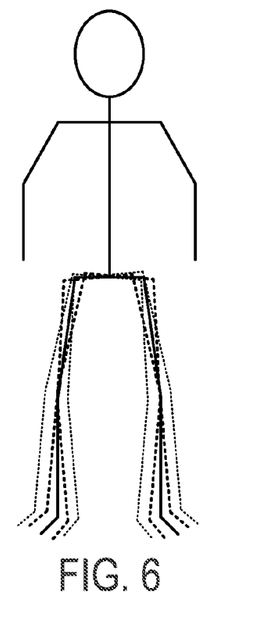

FIGS. 4, 5, and 6 are diagrams depicting different states of an example body position of a player as may be captured in photographs. FIG. 4 depicts the player as may be captured in a photograph without blur being present in the photograph. FIG. 5 depicts the player as may be captured in another photograph with blur being present in a photographic region corresponding to the player's face. FIG. 6 depicts the player as may be captured in yet another photograph with blur being present in a different photographic region corresponding to the player's lower body.

If, for example, scoring of the captured photographs is based on an amount of blur or a location of blur in the captured photographs, then FIGS. 4, 5, and 6 may assigned a different score relative to each other. For example, FIG. 4 may be scored higher than FIGS. 5 and 6, because FIG. 4 includes less blur than FIGS. 5 and 6. If, for example, blur in a face region is weighted more heavily than blur in a region corresponding to another portion of the player's body, then FIG. 5 may be scored lower than FIG. 6, because FIG. 5 has more blur in the face region of the player than FIG. 6. However, it will be appreciated that FIGS. 4, 5, and 6 merely provide some non-limiting examples of how scoring may be utilized to distinguish photographs captured by a gaming system.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of processing photographs of a player obtained during play of an electronic game via an optical interface, the method comprising:
   capturing, via the optical interface, a plurality of photographs of the player in a capture volume during play of the electronic game;
   for each captured photograph of the plurality of captured photographs, programmatically assessing, via instructions executable by a computing device, a photographic characteristic value of one or more photographic characteristics for each of a plurality of different photographic regions of that captured photograph including a body region of the player and a background region of the capture volume, the one or more photographic characteristics including one or more of blur, sharpness, exposure, brightness, contrast, hue, temperature, and saturation;
   for each captured photograph of the plurality of captured photographs, assigning, via the instructions executable by the computing device, a score based on comparing the assessed photographic characteristic value of that captured photograph with a photographic characteristic baseline of the one or more photographic characteristics, and wherein the photographic characteristic value of the body region is weighted more heavily in the score than the photographic characteristic values of other photographic regions including the background region of the captured photograph; and
   visually presenting, via a display, one or more of the captured photographs based on the score of the one or more captured photographs.

2. The method of claim 1, further comprising:
   establishing criteria that define one or more predefined player movements or poses within the capture volume;
   where the score is assigned further for each captured photograph based on comparing an event depicted by that photograph with the established criteria that define one or more predefined player movements or poses within the capture volume.

3. The method of claim 1, further comprising:
   capturing audio via an audio interface at moments corresponding to the captured photographs;

where the score is assigned further for each captured photograph based on comparing a sound level of audio captured during an event depicted by that photograph with a sound level threshold or a model audio signature.

4. The method of claim 1, further comprising:
establishing criteria that define one or more predefined movements or poses of an animated avatar character representative of the player within the electronic game;
where the score is assigned further for each captured photograph based on comparing a movement or pose of the animated avatar character when that photograph is captured with the established criteria that define the one or more predefined movements or poses of the animated avatar character within the electronic game.

5. The method of claim 1, further comprising:
filtering the captured photographs based, at least in part, on the respective scores assigned to the captured photographs; and
varying presentation of the captured photographs to the player responsive to said filtering.

6. The method of claim 1, further comprising:
filtering the captured photographs based, at least in part, on the respective scores assigned to the captured photographs;
presenting the respective scores to the player; and
prompting the player to save or share one or more of the captured photographs after presenting the respective scores to the player.

7. The method of claim 1, further comprising:
identifying a trigger event during play of the electronic game;
initiating said capturing of the plurality of photographs responsive to identifying the trigger event.

8. The method of claim 7, further comprising:
capturing audio via an audio interface during play of the electronic game;
wherein the trigger event includes the captured audio exceeding a sound level threshold or exhibiting a model audio signature.

9. The method of claim 7, further comprising:
establishing criteria that define one or more moments of interest which correspond to predefined movements or poses of the player occurring within the capture volume or of an avatar representative of the player within the electronic game; and
wherein the trigger event includes the player or avatar representative of the player assuming a movement or pose that approximates the established criteria that define the one or more moments of interest.

10. The method of claim 1, further comprising:
identifying one or more of the captured photographs shared by the player with one or more other players within a social network, and wherein the scoring is further based, at least in part, on whether one or more of the captured photographs were shared by the player within the social network.

11. The method of claim 1, further comprising:
identifying one or more player ratings assigned to a photograph of the captured photographs, and wherein the scoring is further based, at least in part, on the one or more player ratings of the photograph.

12. A computing device, comprising:
one or more processors;
a storage device having instructions stored thereon executable by the one or more processors to:

capture via an optical interface, a plurality of photographs of a player in a capture volume during play of an electronic game;
for each captured photograph of the plurality of captured photographs, assess a photographic characteristic value of one or more photographic characteristics for each of a plurality of different photographic regions of that captured photograph including a body region of the player and a background region of the capture volume, the one or more photographic characteristics including one or more of blur, sharpness, exposure, brightness, contrast, hue, temperature, and saturation;
for each captured photograph of the plurality of captured photographs, assign a score based on comparing the assessed photographic characteristic value of that captured photograph with a photographic characteristic baseline of the one or more photographic characteristics, and wherein the photographic characteristic value of the body region is weighted more heavily in the score than the photographic characteristic values of other photographic regions including the background region of the captured photograph; and
visually present, via a display, one or more of the captured photographs based on the score of the one or more captured photographs.

13. The computing device of claim 12, wherein the storage device holds instructions executable by the one or more processors to prompt the player to share one or more of the captured photographs with another player via a computer network after visually presenting the one or more captured photographs.

14. The computing device of claim 12, wherein the storage device holds instructions executable by the one or more processors to establish criteria that define one or more predefined player movements or poses within the capture volume;
where the score is assigned further for each captured photograph based on comparing an event depicted by that photograph with the established criteria that define one or more predefined player movements or poses within the capture volume.

15. The computing device of claim 12, wherein the storage device holds instructions executable by the one or more processors to capture audio via an audio interface at moments corresponding to the captured photographs;
where the score is assigned further for each captured photograph based on comparing a sound level of audio captured during an event depicted by that photograph with a sound level threshold or a model audio signature.

16. The computing device of claim 12, wherein the storage device holds instructions executable by the one or more processors to establish criteria that define one or more predefined movements or poses of an animated avatar character representative of the player within the electronic game;
where the score is assigned further for each captured photograph based on comparing a movement or pose of the animated avatar character when that photograph is captured with the established criteria that define the one or more predefined movements or poses of the animated avatar character within the electronic game.

17. A method of identifying, capturing, and presenting high-quality photo-representations of acts of a player occurring during play of a game that employs motion tracking input technology, comprising:

capturing a baseline photograph;

adjusting exposure and/or recording parameters in response to the baseline photograph to establish a blur baseline;

establishing criteria that define one or more moments of interest which correspond to predefined player movements or positions occurring in a capture volume;

capturing a plurality of photographs of the player during a moment of interest in the game;

assessing a blur value for each of a plurality of different photographic regions of each of the captured photographs;

assigning a respective score to each of the captured photographs based on comparing the blur value of that captured photograph to the blur baseline and further comparing the player's position in that captured photograph with the predefined player movements or positions of the established criteria, and wherein the photographic characteristic value of a designated photographic region is weighted more heavily in the score than the photographic characteristic values of other photographic regions of the captured photograph; and visually presenting, via a display, a photograph having a highest score to the player.

18. The method of claim 17, where a photograph that captures the player's position that most closely matches the predefined player movements or positions of the established criteria with a lowest blur value is assigned the highest score.

19. The method of claim 17, wherein the designated photographic region corresponds to a face and the other photographic regions corresponds to other content that is not a face.

20. The method of claim 17, wherein the designated photographic region is different for different captured photographs.

* * * * *